United States Patent [19]

Yazawa

[11] 4,111,436

[45] Sep. 5, 1978

[54] MECHANICAL SEAL

[75] Inventor: Hiroyuki Yazawa, Kawagoe, Japan

[73] Assignee: Nippon Oil Seal Industry Company, Ltd., Japan

[21] Appl. No.: 700,897

[22] Filed: Jun. 29, 1976

[30] Foreign Application Priority Data

Aug. 30, 1975 [JP] Japan .............................. 50-105479

[51] Int. Cl.$^2$ ............................................ F16J 15/34
[52] U.S. Cl. ................................................. 277/92
[58] Field of Search .................... 277/92, 82, 95, 206.1

[56] References Cited

U.S. PATENT DOCUMENTS

| 3,050,310 | 8/1962 | Kuiken | 277/92 |
| 3,272,519 | 9/1966 | Voitik | 277/206.1 |

Primary Examiner—Robert I. Smith
Attorney, Agent, or Firm—Holman & Stern

[57] ABSTRACT

A mechanical seal assembly for installation about a shaft includes at least one floating seat having intersecting axial and radial seat sections defining an L-shaped seat, the opening of the L-shape receiving a packing therein. The packing is of a rubbery, elastic material and includes a cylindrical inner circumferential surface; a front surface extending generally radially outwardly from one end of said inner circumferential surface and generally aslant toward the other end of said inner circumferential surface; a back surface extending generally radially outwardly from said other end of said inner circumferential surface and generally aslant in generally the same direction as said front surface, said back surface including at least one annular groove slit therein; and a cylindrical outer circumferential surface connecting said back surface with said front surface.

11 Claims, 13 Drawing Figures

MECHANICAL SEAL

BACKGROUND OF THE INVENTION

This invention relates to an end surface seal which is used in the tread guide rollers, and the like of construction machinery such as bulldozers. More specifically, the present invention provides a sealing device which has a remarkably improved sealing action against leakage of lubricant and penetration of outside foreign matters, such as sand, mud, etc., during rotation of the guide roller and the like.

As an end surface seal for guide rollers of the above-described type, it is possible to employ an ordinary mechanical seal having a coil spring. Exemplary of improved seals such as this is the seal illustrated in FIG. 1 and FIG. 3 which has been used conventionally.

Referring first to the seal system shown in FIG. 1, a cylindrical floating seat 2 has a pair of end seal surfaces 3 which encompass shaft 1 and are placed in sliding contact with each other. An outer circumferential surface 4 of this floating seat 2 has a headed conical shape with the diameter thereof decreasing from the position adjacent to the end seal surface 3 axially away therefrom. An inner circumferential surface 6 of a housing 5 also has a frusto-conical shape similar to that of the outer circumferential surface 4 of the floating seat 2. The outer circumferential surface 4 of the floating seat 2 and the inner circumferential surface 6 of the casing 5 clamp an O-ring 7, made of a rubbery elastic material therebetween in a compressed and twisted state in such a manner as to prevent leakage of a shaft lubricant and invasion of sand and mud from the outside. This is achieved by means of the pressed and sliding contact between the end seal surfaces 3 as well as the pressed contact between the outer and inner diameter sections of the O-ring 7.

The system of FIG. 1, however, is not free from inherent drawbacks, such as are mentioned below:

(a) Since the O-ring moves back and forth in its twisted state at the portion contacting the floating seat and housing, there takes place rapid wearing of the contact portion and accumulation of sand and mud.

(b) The contact portion of both the floating seat and housing with the O-ring has a conical shape; hence, it is not easy to maintain an adequate machining accuracy in size and shape.

(c) A load is generated by the elasticity of the O-ring so that it is necessary to maintain the hardness of the rubber at less than 70° in conjunction with the tolerance in the fitting size.

(d) The shape of the floating seat is complicated, which increases the cost of production.

(e) Sealing is achieved by a load which is applied to the seal surface 3 by means of a deflection quantity of the O-ring. For this reason, it is an essential requirement that the load due to deflection reaches a specified level and, at the same time, the amount of the load should not be substantially non-uniform. In systems of the type shown in FIG. 1, the deflection-load characteristics are shown in the diagram of FIG. 2 at a load quantity required for achieving sealing, the change in the load quantity $\Delta P_1$ relative to a change in the deflection quantity $\Delta L_1$ increases. Since the change in the deflection quantity is caused by tolerance in the fitting dimension, there is a strict limitation on the tolerance in the fitting dimension to maintain it small in order to minimize the quantity of change in the load.

Referring now to the system shown in FIG. 3, the flange section encompasses a shaft 11 and has an end seal surface 13. A floating seat 12 comprises a cylinder which extends away from the flange section to an end seal surface 13. Thus, a back surface 14 of the flange section and an outer circumferential surface 15 of the cylinder section form an open section therebetween, and an annular surface 17 on a casing 16 opposes this open section to define a concavity between the open section, the annular surface 17 and the inner circumferential surface 18 of the cylinder. An annular packing 19, made of a rubber-like elastic material, is interposed into the resultant concavity in a compressed state in such a manner as to prevent leakage of a lubricant and invasion of sand and mud from the outside by means of pressed sliding contact of the seal surfaces 13 as well as pressed contact between the annular packing 19, the floating seat 12 and the housing 16.

As shown in FIG. 3, in the above-mentioned system, a load is generated by an angle of inclination of the annular packing 19 and by the hardness of the rubber. Hence, it is necessary either to lower the hardness of the rubber or to accurately maintain the sectional shape of the packing. Stated otherwise, it is required to make the ratio B/A large between the thickness A of the packing in the axial direction and the size B thereof in the direction of radius. (In this instance, it is necessary to make the ratio B/A more than 1.5.)

The deflection-load characteristics of the system of FIG. 3 is shown in FIG. 4. In a manner similar to the system shown in FIG. 1, a change in the load $\Delta P_2$ due to a change in a deflection quantity $\Delta L_2$ increases at a point where there is obtained a load which fully assures sealing. It is therefore imperative to minimize the tolerance in a fitting dimension as much as possible in order to maintain the non-uniformity of the load within a permissibly small range.

SUMMARY OF THE INVENTION

It is an object of the invention to provide an end seal system which has improved deflection-load characteristics.

It is another object of the invention to provide a mechanical seal permitting greater working and assembly tolerances, thus facilitating its ready use.

It is still another object to provide a mechanical seal which permits greater freedom in selecting the packing material therefor.

Other objects and advantages will become apparent from the following description and appended claims taken together with the accompanying drawings.

DETAILED DESCRIPTION OF THE INVENTION

Figure 5:
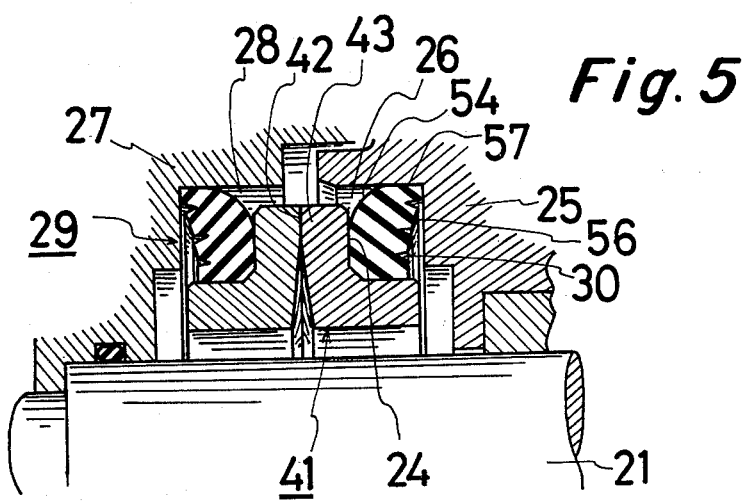
FIG. 5 is a sectional view of an embodiment of the mechanical seal in accordance with the present invention.
Figure 6:
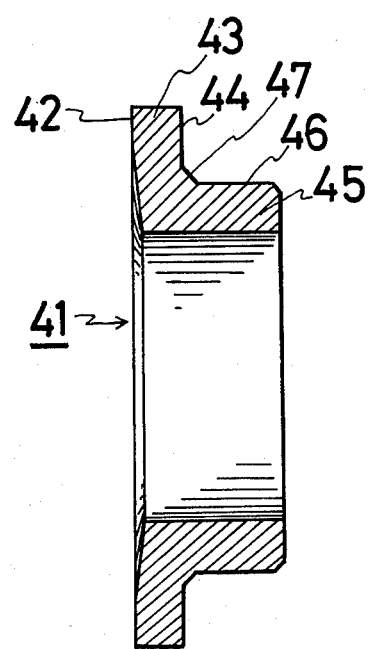
FIG. 6 is a sectional view showing the floating seat used in the embodiment shown in FIG. 5.

FIG. 5 illustrates an embodiment of a mechanical seal in accordance with the present invention wherein floating seats 41 (the detail of which is shown in FIG. 6) surround a shaft 21 and are brought into sliding contact with each other on end seal surfaces 42 thereof. An open section 24 is provided on the opposite side to the end seal surface 42, and an open section 26 of a housing 25 is defined so as to oppose open section 24. Between these open sections 24 and 26, between an open section 28 of casing 27, and the open section of the left-side floating side is interposed a packing 29 in such a fashion that a front surface 54 of the packing 29, specifically the portion in the vicinity of the inner circumferential surface thereof, is positioned in close contact with a flange section 43, as shown in detail in FIG. 7. The front surface 54 is shaped with a certain curvature and the curvature is further increased at the above-mentioned position where the packing fits the inner diameter of the flange section.

FIG. 6 illustrates the detail of the floating seat 41 used in the embodiment shown in FIG. 5. A cylindrical section 45 extends from the inner diameter of an annular flange section 43 in a direction away from the end seal surface 42.

A back surface 44 is located on the opposite side of the flange section 43 to the end seal surface 42 and is connected with the outer circumferential surface 46 via a truncated conical surface 47 so as to define an open port having a substantially L-shape in cross-section.

Figure 7:
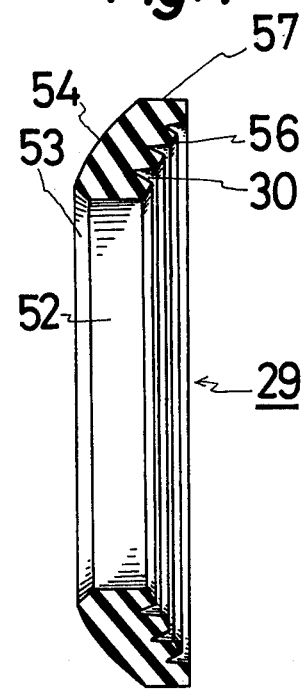
FIG. 7 is a sectional view showing the annular packing used in the embodiment shown in FIG. 5 prior to fitting of the same.
Figures 8A, 8B, 8C, 8D:
FIGS. 8a–d illustrate various shapes of groove slits to be formed on the back surface of the annular packing.

FIG. 7 illustrates the shape of the packing used in the embodiment of FIG. 5. The packing 29 is formed in an annular shape and made of a rubbery elastic material. An inner circumferential surface 52 of this annular member has a cylindrical shape and a front surface 54 extends outwardly and backwardly in the radial direction with its sectional shape being of a protrusive curve joined to one end of surface 52 via a truncated conical surface 53. A back surface 56 extends from the other end of surface 52, relative to the direction of the axis, backwardly and to the outside, and is provided with one or a plurality of annular groove slits 30. The front surface is connected with the back surface 56 via an annular outer circumferential surface 57.

FIGS. 8a–d illustrates typical groove slits that are provided in the back surface 56. The embodiment a shows a triangularly-shaped slit; embodiment b slit approximates the shape of a waterdrop; embodiment c slit has a round-bottomed shape tapered to the open section; and embodiment d slit is rectangular. The shape, size and number of groove slits determines the correlation between the displacement quantity in the axial direction and the surface load as will be explained more specifically elsewhere in this specification.

Figures 9A, 9B:
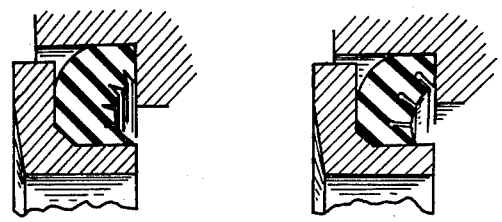
FIGS. 9a and 9b are sectional views showing the conditions wherein the annular packing is curved during the assembly depending on the shape of the groove slits.

FIGS. 9a and b illustrate the condition wherein the sectional shape of the packing is curved during the assembly of the mechanical seal. FIG. 9a shows that the packing is curved when it has slits as in embodiment a of FIG. 8. FIG. 9b shows that when the packing has slits as in FIG. 8, embodiment b, the packing is likewise curved.

Figure 10:
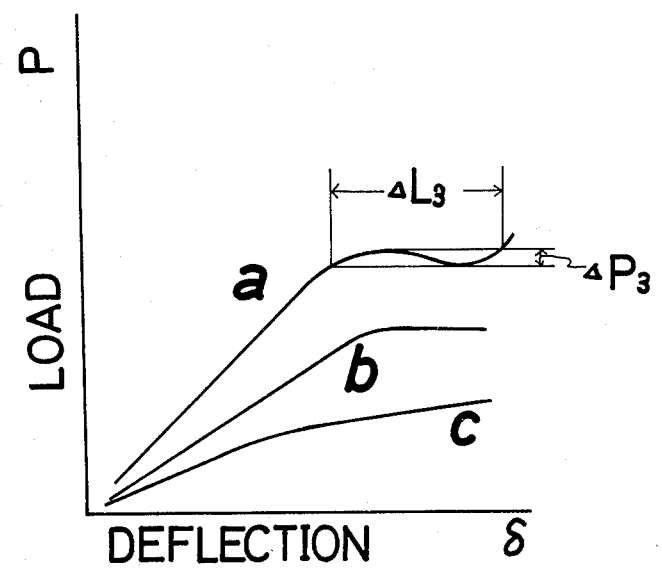
FIG. 10 is a diagram showing a characteristic curve of the mechanical seal in accordance with the present invention.

The mechanical seal in accordance with the present invention has the following features:

First, because of the shape recovery or repulsive force of the packing, the pressure load required for sealing can be designed and selected optionally as shown in the diagram of FIG. 10 wherein the abscissa represents a deflection quantity δ, to represent a compression quantity of the packing, while the ordinate represents a pressure load P.

At the initial stages of the compression, a simple repulsive force acts in response to the compression, and the load P exhibits a linear increase until the compression quantity and the curve becomes substantially flat at this point. Accordingly, the displacement of the assembly dimension is permissible within the range of Δ $L_3$ when the fluctuation of the load P is in the range of Δ $P_3$. This phenomenon results from the presence of the annular groove slits 30 defined on the back surface 56 of the packing as well as the fact that the packing is buckled up due to the protrusive curvature of the front surface. Depending upon the shape, size, position or number of the groove slits, the shape of the FIG. 10 curve can be determined, to wit, the position of the flat section and the load value, at the flat section.

In the embodiment shown, the sectional shape of the front surface 54 of the annular packing 29 is of a protrusive curve. When a sufficient curve of the packing 29 is obtained at the time of compression, due to properties of the material used or the shape and size of the annular groove slits 30, the front surface 54 may have a linear sectional shape. The curves b and c in FIG. 10 represent the deflection versus load of other packings.

Figure 1:
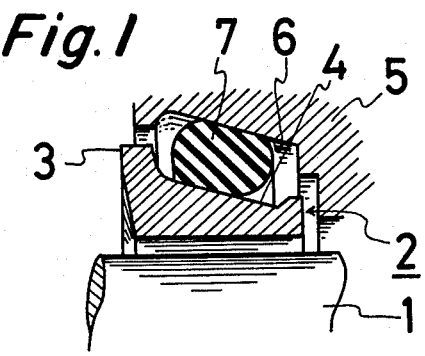
FIG. 1 is a sectional view showing an example of a conventional mechanical seal comprising floating seats having an O-ring and end seal surfaces onto which headed conical surface the O-ring is fitted.
Figure 3:
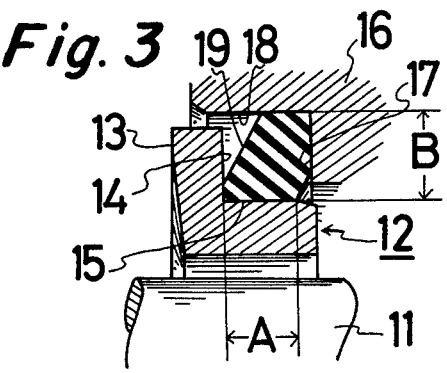
FIG. 3 is a sectional view showing an example of a conventional mechanical seal comprising floating seats each having an end seal surface and a substantially L-shaped section, and an annular packing fitted in a compressed state into a concavity defined between the open section of the floating seats and a portion of the housing opposed thereto.
Figure 2:
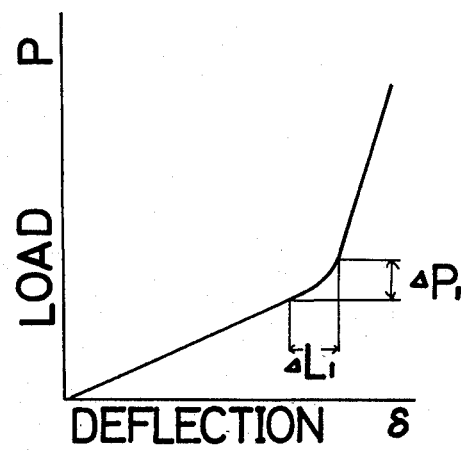
FIG. 2 is a diagram showing the correlation between a deflection quantity $\delta$ due to compression and a compression surface load P.
Figure 4:
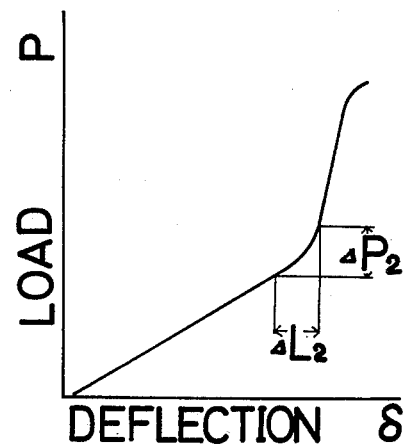
FIG. 4 is a diagram showing the correlation between a compression deflection quantity δ and a compression surface load P of the mechanical seal shown in FIG. 3.

Because of the above-described feature in the present invention, the assembly dimension of the mechanical seal may be designed so as to coincide with the flat section of the above-mentioned curve whereby there hardly occurs any change in the surface load for sealing due to fluctuation of the assembly dimension, which thereby ensures a stable sealing action. It is another advantage of the present invention that the present invention is free from the restriction imposed in prior art systems on the hardness of the rubber in the selection thereof due to the fact that the pressure load in the vicinity of the assembly dimension in the above-mentioned diagram results from the recovery or repulsive force of bending of the packing section. In other words, this feature allows an extremely free selection of the rubber material to be used. In addition, since the load results from bending of the packing, there is no restriction, either, of the ratio B/A of the width A in the axial direction to the width B in the radial direction, which has already been described with respect to the embodiment shown in conjunction with FIG. 2. That is to say, in accordance with the present invention, the ratio B/A can be optionally maintained as less than 1.

The inner circumferential section 52 of the packing 29 is fitted into contact with the cylindrical outer circumferential surface 46 of the floating seats 41, and the truncated conical surface 53 having a sectional angle of about 30°–45°, is fitted in contact with the front section 54 of the inner circumference. When the pressure of the lubricant placed in the groove slit 35 positioned nearest the inner circumference is elevated, it presses the edge of the packing having a tongue-like section over the cylindrical outer circumferential surface 46 of the floating seats 41 and thereby enhances the sealing action.

In the embodiment so far described, a pair of opposed floating seats 41 each having annular packing 29 fitted thereto are placed into sliding contact with each other. Alternatively, in another embodiment (not shown) the above-described floating seat may be placed in sliding contact with a fixed ring which is provided to the housing.

As has hereinabove been noted, the mechanical seal of the present invention has excellent sealing characteristics for the tread guide roller and provides an improved seal permitting larger allowances for the working and assembly tolerances to thereby assure extremely easy operation and assembly.

What I claim is:

1. In a mechanical seal assembly for installation on a shaft including an annular floating seat having annular axial and annular radial sections intersecting to define therebetween a generally L-shaped seat for receiving a force-loaded packing therein, and an annular packing formed of a rubbery elastic material non-rotationally with respect to said seat positioned in the opening of said L-shaped seat, the improvement comprising said annular packing including:
   (a) a cylindrical inner circumferential surface;
   (b) a front surface extending generally radially outwardly from one end of said inner circumferential surface and generally aslant toward the other end of said inner circumferential surface;
   (c) a back surface extending generally radially outwardly from said other end of said inner circumferential surface and generally aslant in generally the same direction as said front surface, said back surface including at least one annular groove slit therein; and
   (d) a cylindrical outer circumferential surface connecting said back surface with said front surface; said packing disposed in said L-shaped seat with said inner circumferential surface in contact with the surface of said axial section within said L-shaped seat.

2. The mechanical seal is defined in claim 1 wherein said front surface has the shape of a protrusive curve in a free state.

3. The mechanical seal as defined in claim 1 wherein said front surface is connected with said inner circumferential surface via a headed conical surface and said headed conical surface is disposed at the intersection of said axial and radial seat sections.

4. The mechanical seal as defined in claim 1 wherein a plurality of said annular groove slits are provided in said back surface.

5. The mechanical seal as defined in claim 1 wherein said annular groove slit provided in the back surface is located in the vicinity of said inner circumferential surface.

6. The mechanical seal as defined in claim 1 wherein the sectional shape of said annular groove slit provided in the back surface is substantially triangular.

7. The mechanical seal as defined in claim 1 wherein the sectional shape of said annular groove slit provided in the back surface is substantially that of a waterdrop.

8. The mechanical seal as defined in claim 1 wherein the sectional shape of said annular groove slit provided in the back surface is substantially a round-bottomed shape tapered to the open section.

9. The mechanical seal as defined in claim 1 wherein the sectional shape of said annular groove slit provided in the back surface is substantially rectangular.

10. The mechanical seal as defined in claim 3 wherein the angle of inclination of said headed conical surface is in the range of 30° to 45°.

11. In a mechanical seal assembly for installation on a shaft including a pair of annular floating seats, each said seat having annular axial and annual radial sections intersecting to define therebetween a generally L-shaped seat for receiving a force-loaded packing therein, and an annular packing formed of a rubbery elastic material non-rotationally with respect to said seat positioned in the opening of said L-shape, said radial section of each seat having said face remote from said opening in surface sealing contact with the corresponding face of said other seat, the improvement comprising said annular packing including:
   (a) a cylindrical inner circumferential surface;
   (b) a front surface extending generally radially outwardly from one end of said inner circumferential surface and generally aslant toward the other end of said inner circumferential surface;
   (c) a back surface extending generally radially outwardly from said other end of said inner circumferential surface and generally aslant in generally the same direction as said front surface, said back surface including at least one annular groove slit therein; and
   (d) a cylindrical outer circumferential surface connecting said back surface with said front surface; said packing disposed in said opening with said inner circumferential surface in contact with the surface of said axial section within said opening.

* * * * *